(12) United States Patent
Frenkel et al.

(10) Patent No.: US 11,984,129 B2
(45) Date of Patent: May 14, 2024

(54) COMPUTERIZED MONITORING OF DIGITAL AUDIO SIGNALS

(71) Applicant: NICE LTD., Ra'anana (IL)

(72) Inventors: Roman Frenkel, Ashdod (IL); Matan Keret, Oulu (FI); Michal Daisey Lerer, Hadera (IL)

(73) Assignee: NICE LTD., Ra'anana (IL)

( * ) Notice: Subject to any disclaimer, the term of this patent is extended or adjusted under 35 U.S.C. 154(b) by 51 days.

(21) Appl. No.: 18/064,638

(22) Filed: Dec. 12, 2022

(65) Prior Publication Data

US 2023/0110911 A1    Apr. 13, 2023

Related U.S. Application Data

(62) Division of application No. 17/344,650, filed on Jun. 10, 2021, now Pat. No. 11,545,159.

(51) Int. Cl.
*G10L 19/00* (2013.01)
*G10L 17/02* (2013.01)
*G10L 25/30* (2013.01)

(52) U.S. Cl.
CPC ............ *G10L 19/00* (2013.01); *G10L 17/02* (2013.01); *G10L 25/30* (2013.01)

(58) Field of Classification Search
CPC .......... G10L 19/00; G10L 17/02; G10L 25/30
USPC ....................................................... 704/200
See application file for complete search history.

(56) References Cited

U.S. PATENT DOCUMENTS

| | | |
|---|---|---|
| 5,764,698 A | 6/1998 | Sudharsanan et al. |
| 7,020,257 B2 | 3/2006 | Li |
| 8,880,412 B2 * | 11/2014 | Kim ................. G10L 25/21 370/263 |
| 10,380,332 B2 | 8/2019 | Li et al. |
| 10,732,258 B1 * | 8/2020 | Sundaram ............ G01S 5/18 |
| 10,854,204 B2 | 12/2020 | Faians et al. |
| 2006/0036436 A1 * | 2/2006 | Halcrow ............ G10L 19/00 704/230 |

(Continued)

FOREIGN PATENT DOCUMENTS

CA    2 690 433    1/2016

OTHER PUBLICATIONS

A. Manzo-Martínez and J. A. Camarena Ibarrola, "Use of the entropy of a random process in audio matching tasks," 2015 38th International Conference on Telecommunications and Signal Processing (TSP), Prague, Czech Republic, 2015, pp. 1-6, doi: 10.1109/TSP.2015.7296439. keywords: {Entropy; Robustness;Fi (Year: 2015).*

(Continued)

*Primary Examiner* — Bharatkumar S Shah
(74) *Attorney, Agent, or Firm* — Haynes and Boone, LLP

(57) ABSTRACT

A digital audio quality monitoring device uses a deep neural network (DNN) to provide accurate estimates of signal-to-noise ratio (SNR) from a limited set of features extracted from incoming audio. Some embodiments improve the SNR estimate accuracy by selecting a DNN model from a plurality of available models based on a codec used to compress/decompress the incoming audio. Each model has been trained on audio compressed/decompressed by a codec associated with the model, and the monitoring device selects the model associated with the codec used to compress/decompress the incoming audio. Other embodiments are also provided.

12 Claims, 8 Drawing Sheets

(56) References Cited

U.S. PATENT DOCUMENTS

| | | | | |
|---|---|---|---|---|
| 2016/0098999 A1* | 4/2016 | Jacob | ............ | G10L 19/00 704/201 |
| 2019/0385630 A1 | 12/2019 | Sivaraman et al. | | |
| 2021/0174791 A1* | 6/2021 | Shen | ............ | G06N 3/04 |

OTHER PUBLICATIONS

U.S. Appl. No. 17/344,650, filed Jun. 10, 2021, Roman Frenkel.

A. Nishimura, "Data Hiding for Audio Signals That are Robust with Respect to Air Transmission and a Speech Codec," 2008; International Conference on Intelligent Information Hiding and Multimedia Signal Processing, pp. 601-604, DOI: 10.1109/IIH-MSP.2008.333 (2008).

Prasanta Kumar Ghosh; et al., "Robust Voice Activity Detection Using Long-Term Signal Variability"; *IEEE Transactions on Audio, Speech, and Language Processing*, vol. 19, No. 3, Mar. 2011; pp. 600-613.

Ji Wu, "An efficient voice activity detection algorithm by combining statistical model and energy detection", *EURASIP Journal on Advances in Signal Processing*, Dec. 2011 DOI: 10.1186/1687-6180-2011-18.

Andreas Tsiartas, et al., "Multi-band long-term signal variability features for robust voice activity detection"; Interspeech 2013 (© 2013 ISCA); pp. 718-722.

Pavlos Papadopoulos, et al., "A Supervised Signal-To-Noise Ratio Estimation of Speech Signals"; *IEEE International Conference on Acoustic, Speech and Signal Processing* (ICASSP); 2014; pp. 8287-8291.

Pavlos Papadopoulos, et al., "Long-Term SNR Estimation of Speech Signals in Known and Unknown Channel Conditions", *IEEE/ACM Transactions on Audio, Speech and Language Processing*, vol. 24, No. 12; Dec. 2016; pp. 2495-2506.

Geoffrey Fouad, et al., "Reginal regression models of percentile flows for the contiguous US: Expert versus data-driven independent variable selection"; *Hydrology and Earth System Sciences Discussions*; Dec. 19, 2016; pp. 1-33.

Naim Mansour, et al., "A method for realistic, conversational signal-to-noise ratio estimation"; *The Journal of the Acoustical Society of America*; Mar. 5, 2021; pp. 1559-1566.

* cited by examiner

LTE Feature Example

00 = {float64} 14.692378154271776
01 = {float64} 12.193542399020046
02 = {float64} 13.513496075421363
03 = {float64} 10.936336442977986
04 = {float64} 12.223691614480928
05 = {float64} 9.788758109759478
06 = {float64} 11.122840638486808
07 = {float64} 8.974438934270229
08 = {float64} 10.307446584373697
09 = {float64} 8.322468175339775
10 = {float64} 9.734322791873005
11 = {float64} 7.867729344080890725

LTE Feature Calculation 350

$E_t(n,f)$

↓

610 — Determine mean energy $ME(n)$ for each frame $n$

↓

620 — Moving average smoothing to determine smoothed profile $SE_W(n)$ for each smoothing window size

↓

630 — Use $SE_W(n)$ distribution percentiles to determine LTE features

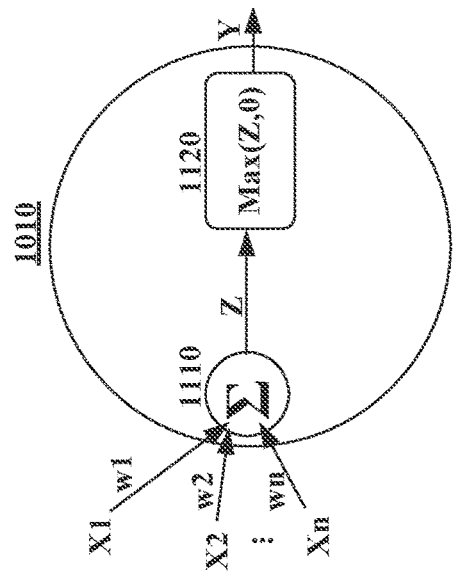
FIG. 9
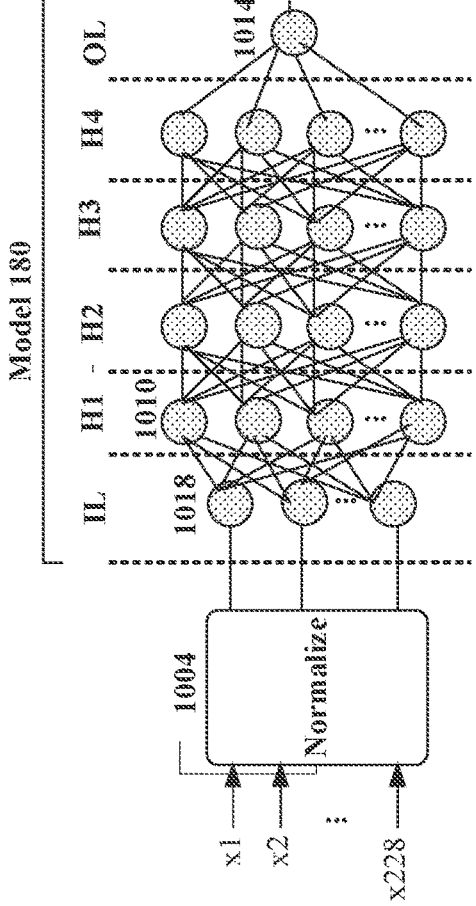
FIG. 10
FIG. 11

COMPUTERIZED MONITORING OF DIGITAL AUDIO SIGNALS

CROSS-REFERENCE TO RELATED APPLICATIONS

This application is a divisional application of U.S. patent application Ser. No. 17/344,650, filed Jun. 10, 2021, now allowed, the entire contents of which is hereby incorporated herein by express reference thereto.

FIELD OF THE INVENTION

The present disclosure relates to computerized audio signal processing used to monitor digital audio signals. Some embodiments can be used in audio communications, audio recordings, voice biometrics, speech recognition, and other tasks.

BACKGROUND OF THE INVENTION

In telephone and computer audio communications and audio recordings, sound is represented as audio signals of electric, magnetic, or electromagnetic nature. Audio signals can be impaired by noise, such as environmental (background) noise or noise caused by packet loss in network transmission and/or by defects in communication lines or audio processing equipment for example. Therefore, audio signals are sometimes monitored to detect and possibly correct for noise. As an example, audio processing equipment used by organizations such as companies, public agencies, and others, may include audio quality monitoring devices to monitor telephone or computer audio interactions with customers in order to detect high noise levels and repair the audio signals or the audio processing equipment as needed to provide good customer service or meet other technical, business, or legal needs. For example, an organization may use customer voice for customer identification and authentication in order to prevent unauthorized access to customers' private data stored by the organization, e.g. credit card numbers, addresses, etc. Audio quality monitoring is important because customer identification and authentication may be unreliable if noise is high. Also, an organization may want to record customer interaction for use as evidence that the customer authorized credit card charges or ordered a particular product or requested or consented to a transaction or service, and such recordings may be subject to business or legal requirements with respect to audio quality. Other tasks requiring good audio quality include speech recognition (for speech-to-text conversion or other purposes), voice analytics, and others. Therefore, audio quality monitoring devices are an important component of many communication and recording systems.

Audio is often processed in digital form, and digital audio quality monitoring may require significant amounts of computer resources such as storage, communication bandwidth, and computing power. Further, computerized audio monitoring is not perfect because a computer cannot always distinguish between the audio signal and noise, and it is desirable to provide more reliable and accurate audio quality monitoring without requiring large amounts of computer resources.

SUMMARY

This section summarizes some aspects of some embodiments of the invention. The invention is not limited to such aspects, but is defined by the appended claims.

Some embodiments of the present invention provide reliable computerized audio quality monitoring devices and methods based on machine learning without requiring the substantial computer resources typically associated with machine learning.

As is well known, machine learning techniques for audio quality monitoring may involve creating a computerized model of Signal-to-Noise Ratio (SNR), training the model on audio signals containing known amounts of noise, and then executing the model on audio signals of interest to obtain the SNR for such signals. See Papadopoulos et al., "Long-Term SNR Estimation of Speech Signals in Known and Unknown Channel Conditions", *IEEE/ACM Transactions On Audio, Speech And Language Processing*, vol. 24, No. 12 (December 2016), pages 2495-2506, incorporated herein in its entirety by express reference thereto. Typically, to estimate the SNR in the incoming signal, the model does not use all of the audio signal data, but only uses some features extracted from the audio signal data. The features do not include all of the information in the audio data in order to reduce the computer resources required for model training and execution, and in order to avoid confusing the model by irrelevant information that may be present in the incoming audio data.

Computer resource requirements for model training and execution depend on the choice of the features, and some embodiments of the present invention achieve accurate, reliable SNR estimates with a small set of features. For example, some embodiments use a minimal set of 228 features including Long Term Energy (LTE) features and Long Term Signal Variability (LTSV) features, and do not use pitch features or any other features.

Further, in some embodiments, SNR estimates are improved by taking into account the codec involved in audio processing. Codecs are used to digitally encode the audio, and many codecs compress the audio to make the audio more suitable for storage or transmission, and decompress the audio for playback or other purposes. The decompressed audio may be different from the original audio if compression was lossy, and the decompressed audio depends on the codec. Some embodiments of the present invention use different models for different codecs. Each model can be associated with a codec, and can be trained on audio that was compressed and then decompressed using the codec. When the audio monitoring device receives audio being monitored for SNR, the device determines the codec used to compress/decompress the received audio, and the device determines the SNR by using the model trained on that codec.

The invention disclosed herein is not limited to combining the two techniques described above, i.e. the model selection based on the codec and the small number of features. For example, these two techniques can be used separately or together.

Audio quality monitoring devices of some embodiments of the present invention are used as components in many types of audio processing, including customer identification and authentication, speech recognition, and others, and may be used to comply with legal or business requirements such as Payment Card Industry Data Security Standard (PCI DSS), General Data Protection Regulation (GDPR, used in European Union), and/or other requirements, in order to protect customer data privacy or transaction integrity or for other purposes. As an example, for credit card transactions, PCI does not allow organizations to store credit card CV2 codes, and if the customer provides a CV2 code in audio interaction and the customer voice is recorded, the organization must interrupt the recording to omit the CV2 code, or must delete the CV2 code if it was recorded. The audio recordings can be audited, and must be of sufficient quality to allow verification that the recordings are free of the CV2 codes, or allow recognition and deletion of CV2 codes if inadvertently recorded. Some embodiments of the present invention monitor the audio quality during interaction with the customer, and if the audio quality is inadequate, some embodiments alert the organization with appropriate signals to allow the organization to take a suitable action, e.g. stop the recording and/or refuse to proceed with the credit card transaction.

In another example, audio quality monitoring is part of customer authentication. Customers may request enrollment into voice biometrics authentication to better protect their data stored by the organization. The organization may then generate voiceprints that capture numerous characteristics of customer voice, such as tone, pitch, etc. According to some embodiments, the audio quality is monitored when the customer voice is being captured, and if the audio quality is inadequate then the audio is not used for enrollment in order to reduce errors in biometric authentication.

Some embodiments of the present invention are used with fraud detection techniques, such as described in U.S. Pat. No. 10,854,204, "SEAMLESS AUTHENTICATION AND ENROLLMENT", issued on Dec. 1, 2020 to NICE, LTD, incorporated herein in its entirety by express reference thereto. As described therein, an organization may store voiceprints of known fraudsters, and may use them to determine if a caller presents a high risk of being a fraudster. Some embodiments of the present invention are used to detect poor audio quality and hence poor reliability of fraudster detection in a particular audio interaction, thus possibly forcing the organization to rely on alternative fraud prevention techniques and/or to refuse to proceed with a transaction.

The invention is not limited to the particulars described above except as defined by the appended claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

FIG. 9 is a visual illustration of audio data for audio processing according to some embodiments of the present invention.

FIGS. 10 and 11 illustrate audio processing by a deep neural network according to some embodiments of the present invention.

DESCRIPTION OF SOME EMBODIMENTS

The embodiments described in this section illustrate but do not limit the invention. In particular, the invention is not limited by specific machine learning parameters, noise sources, or other particulars except as defined by the appended claims.

Figure 1:
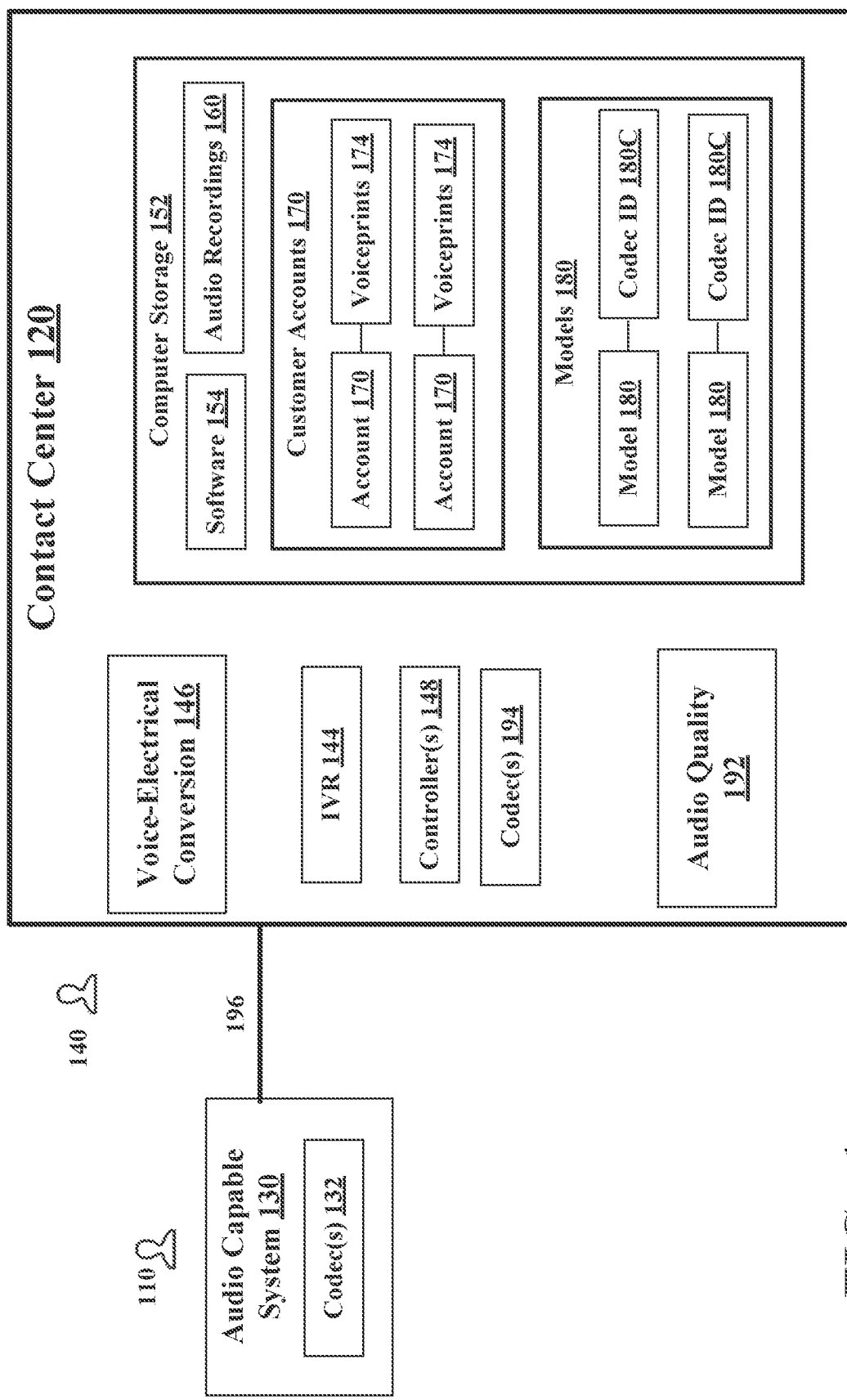
FIG. 1 illustrates audio interaction according to some embodiments of the present invention.

FIG. 1 illustrates an exemplary audio interaction between a customer 110 and an organization's contact center (or call center) 120. The customer uses an audio-capable system 130 that may include a telephone set, a computer, tablet, and/or some other device that can encode the customer's voice into electric or magnetic or electromagnetic audio signals, process the audio signals as needed for transmission, and transmit the audio signals to call center 120. System 130 can also receive audio signals from call center 120 and play them back as sound. Alternatively or in addition, system 130 may generate audio signals from text typed by the customer, to obtain audio representation of the text; and/or system 130 may convert audio signals received from center 120 into text that could be stored or displayed on a computer monitor (not shown) of system 130. Other modes of communication, such as conversion between Braille and audio signals, are also possible. Further, system 130 may execute other software applications (e.g. mobile applications if system 130 is mobile) that generate audio signals or consume audio signals, and system 130 may send the audio signals generated by such applications to call center 120, and system 130 may provide, to such applications, audio signals received from center 120.

In some embodiments, system 130 may transmit and/or receive audio signals in analog form. Other embodiments use digital audio, e.g. Voice over IP (VoIP), and system 130 may include one or more codecs 132 to encode and possibly compress the digital audio for storage or transmission, and decode and possibly decompress the audio for playback or other purposes. Codecs 132 may be implemented by hard-wired circuits and/or by software-programmable controllers (e.g. computer processors, not shown), as known in the art.

Call center 120 is operated by human agents 140 and/or automatic voice systems such as Interactive Voice Response (IVR) 144. Center 120 includes telephone sets and/or computers for audio communication with customer 110, and in particular may include equipment 146 for conversion between audio signals and voice as needed for voice communication with agents 140. Center 120 is controlled by one or more controllers 148, such as computer processors or other software programmable or non-programmable controllers. Center 120 includes, or at least has access to, computer storage 152 storing software instructions 154 executed by controllers 148 (if controllers execute software instructions), and stores data manipulated by the controllers or other devices at center 120. The data may include audio recordings 160; customer account information 170 possibly including customer voiceprints 174 for customer identification or authentication; data and instructions 180 defining trained and untrained models 180 and their associated codec identifiers 180C if applicable; and other data as needed.

Separately shown is Audio Quality device 192 for monitoring audio quality as described below. AQ 192 uses models 180, and can be implemented by separate circuits and/or by one or more controller(s) 148, possibly using software 154.

Center 120 also includes one or more codecs 194, which can be implemented by one or more controller(s) 148, possibly using software 154, and/or by separate circuits. Exemplary codecs are G729 and G711, which have been standardized by ITU-T (ITU Telecommunication Standardization Sector of International Telecommunication Union). The G729 and G711 codecs perform lossy compression. Other codecs can be provided instead of or in addition to G729 and/or G711.

Customer system 130 and call center 120 communicate over network 196, which can be any telephone and/or data network, possibly including the Internet, VoIP, etc.

Figure 2:
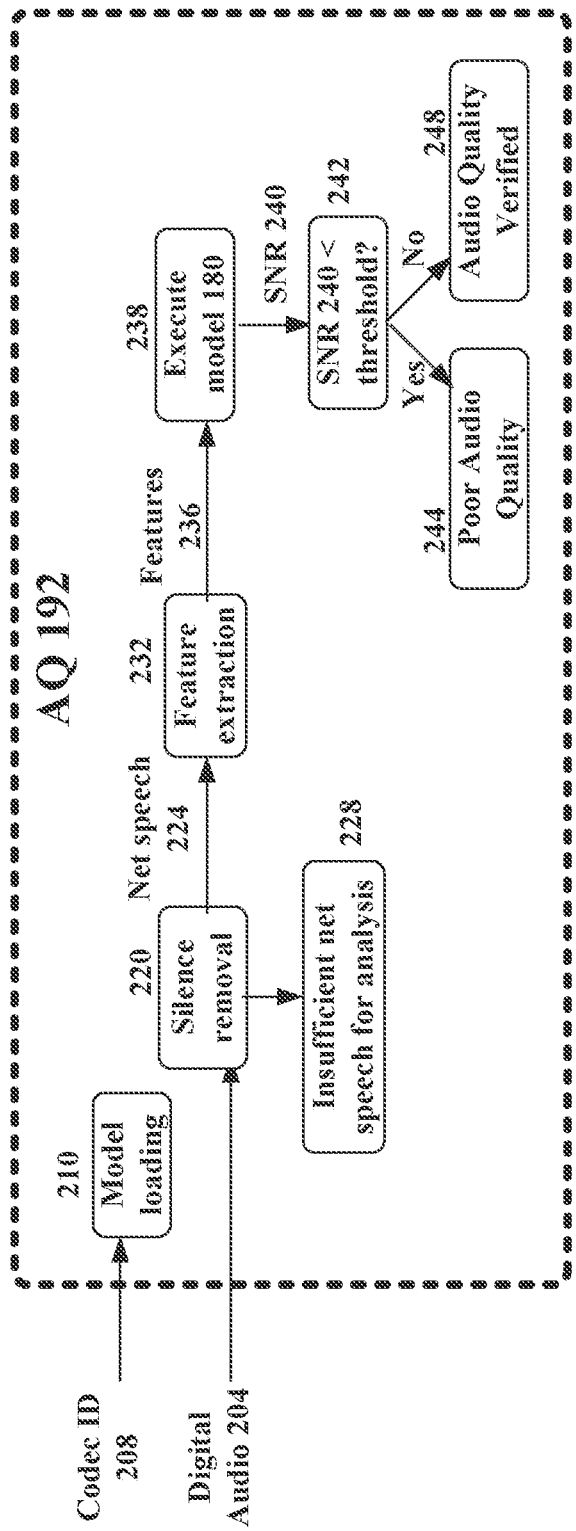
FIGS. 2 and 3 illustrate aspects of audio quality monitoring according to some embodiments of the present invention.

FIG. 2 illustrates an example audio quality monitoring process performed by AQ 192 on digital audio data 204 representing an audio stream, e.g. a stream produced by customer 110 and/or agent 140 and/or IVR 144, possibly in interaction with each other. Customer audio can arrive at call center 120 over network 196 in analog or digital form. If analog, the audio is digitized by converters 146 before being provided to AQ 192 as data 204. Digital audio 204 can be generated during interaction in real time, or can be pre-recorded audio read out of database 160 or other storage.

When provided to AQ 192, digital audio 204 is not compressed. If the audio was compressed, whether by customer codec 132 or contact center codec 194 or by some other system, the digital audio is decompressed for input to AQ 192. The relevant codec ID 208 is provided to AQ 192 together with audio data 204, to enable AQ 192 to select and load a proper model at step 210. If audio 204 was compressed/decompressed multiple times, the codec ID 208 may identify any of the codecs previously used for encoding of audio 204 or for lossy compression of audio 204, or the most recent codec used for compression, or the most recent codec used for lossy compression. In some embodiments, codec ID 208 may indicate that the codec is unknown, and/or the audio has not been subject to lossy compression, and/or it is unknown whether the audio has been subject to lossy compression. If the codec is unknown, codec ID 208 may specify the most likely codec, e.g., a codec pre-configured by a human administrator for contact center 120. Codec ID 208 may be omitted, as some AQ embodiments use the same model 180 regardless of the codec used on audio 204.

In block 210, AQ 192 determines a model 180 for processing the digital audio 204. The model 180 may be determined using codec ID 208. If needed, AQ 192 loads the model 180 into the AQ memory (possibly a portion of computer storage 152).

In block 220, AQ 192 detects and removes silences in digital audio 204. Silence removal may be done using known Voice Activity Detection (VAD) techniques, such as, for example, a technique based on a state machine for detecting energy level increase; or a technique based on Gaussian mixture model (GMM). See for example the following documents, incorporated herein in their entirety by express reference thereto: U.S. Pat. No. 7,020,257 B2, issued Mar. 28, 2006 to Li; Ji WU, "An efficient voice activity detection algorithm by combining statistical model and energy detection", *EURASIP Journal on Advances in Signal Processing*, December 2011 DOI: 10.1186/1687-6180-2011-18. The invention is not limited to silence removal. However, the inventors have discovered that silence removal may increase the accuracy of the SNR estimate provided by the model executed in block 238. Also, in some embodiments, VAD is less computationally expensive than model execution in block 238, so it is more computationally efficient to remove the silence periods than to execute the model on the silence periods, especially when the noise levels are high.

The remaining digital audio 224, with silence removed, is called "net speech".

In some embodiments, AQ 192 waits to obtain some minimum, pre-set length of net speech in block 220, e.g., the length of three seconds, before proceeding with noise estimation. If AQ 192 fails to obtain sufficient net speech, AQ 192 aborts quality monitoring operation for digital audio stream 204, as indicated by block 228.

Feature extraction block 232 extracts features (regressors) 236 from net speech 224. In some embodiments, the feature set is small, e.g. consisting of 228 features. Features 236 are provided to model 180 executed in block 238. Model 180 outputs a noise estimate 240, e.g., an estimate of the signal-to-noise ratio (SNR) in digital audio 204.

SNR 240 can be used for various processing operations as needed. In the example of FIG. 2, SNR 240 is compared to a predefined decision threshold in block 242 to classify the audio data 204 as having good or poor quality. If SNR 240 is below the threshold, AQ 192 generates a signal at step 244 to indicate poor quality. Otherwise, a signal is generated at step 248 to indicate good quality. In some embodiments, step 238 involves comparisons with multiple thresholds to determine appropriate uses for digital audio 204. For example, the digital audio may be adequate for some tasks but inadequate for others such as enrollment in biometric identification or for PCI- or GDPR-compliant recording. AQ 192 generates signals indicative of the results of comparisons with multiple thresholds.

Figure 3:
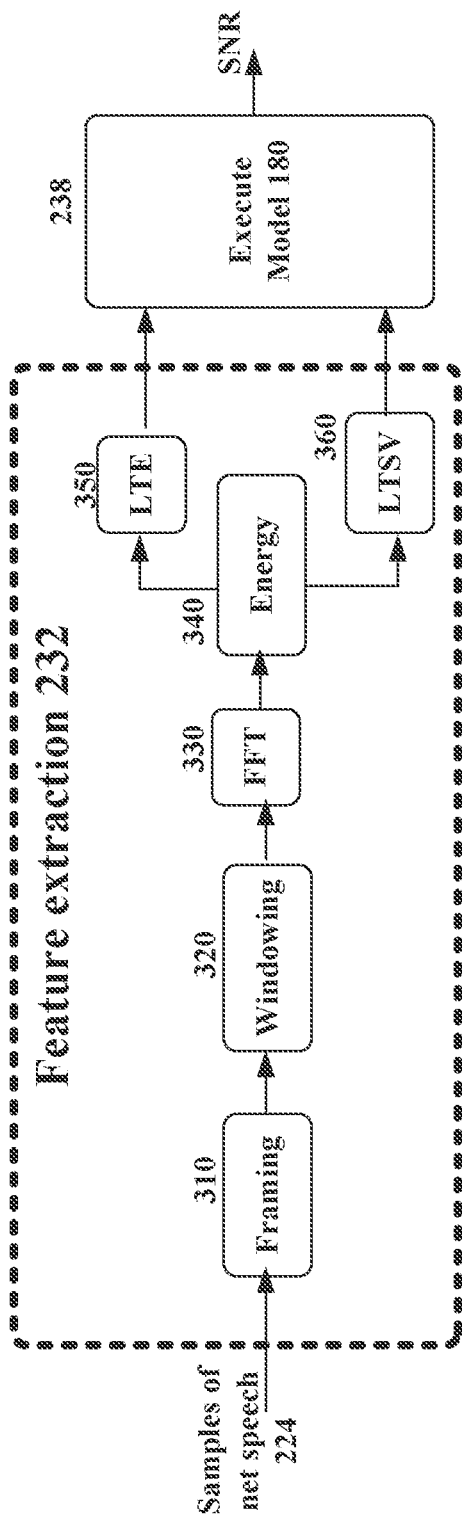

FIG. 3 illustrates feature extraction operation 232. The feature extraction is performed on samples of net speech 224. A sample can be of any suitable duration; an exemplary duration is 30 seconds. Each sample will be classified in blocks 232-248 as good or poor quality. Features 236 are extracted from each sample as follows.

Figure 4:
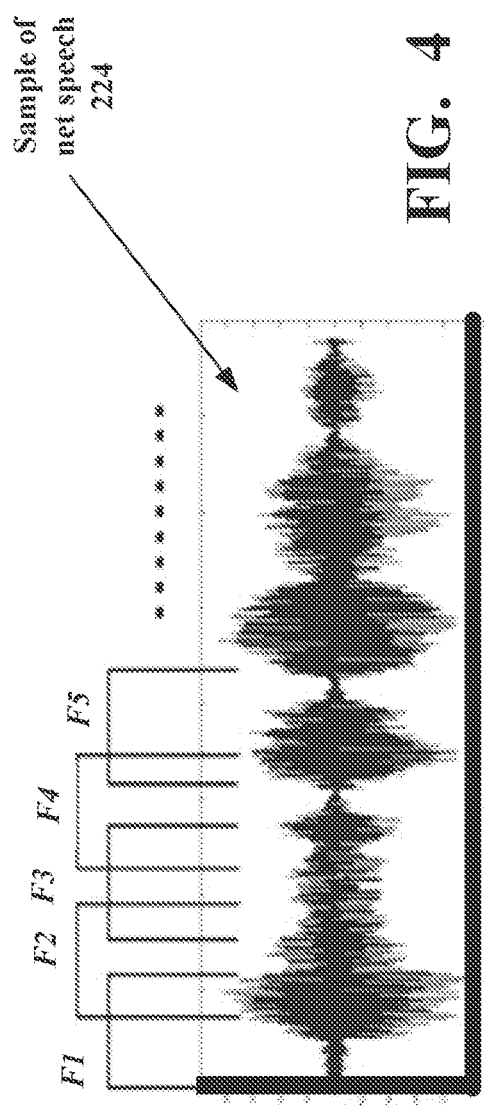
FIGS. 4, 5A, 5B, 5C are diagrams of signals used in audio signal processing according to some embodiments of the present invention.

Framing block 310 defines frames in the sample as shown in FIG. 4. The frames are shown as F1, F2, etc. A frame may have a predefined duration, e.g., 25 ms or about 25 ms, and adjacent frames may overlap, e.g. have an overlap equal to, or close to, 10 ms. The frame durations and overlap durations are exemplary and not limiting, as is true for all dimensions in the exemplary embodiments described herein.

Figures 5A, 5B, 5C:
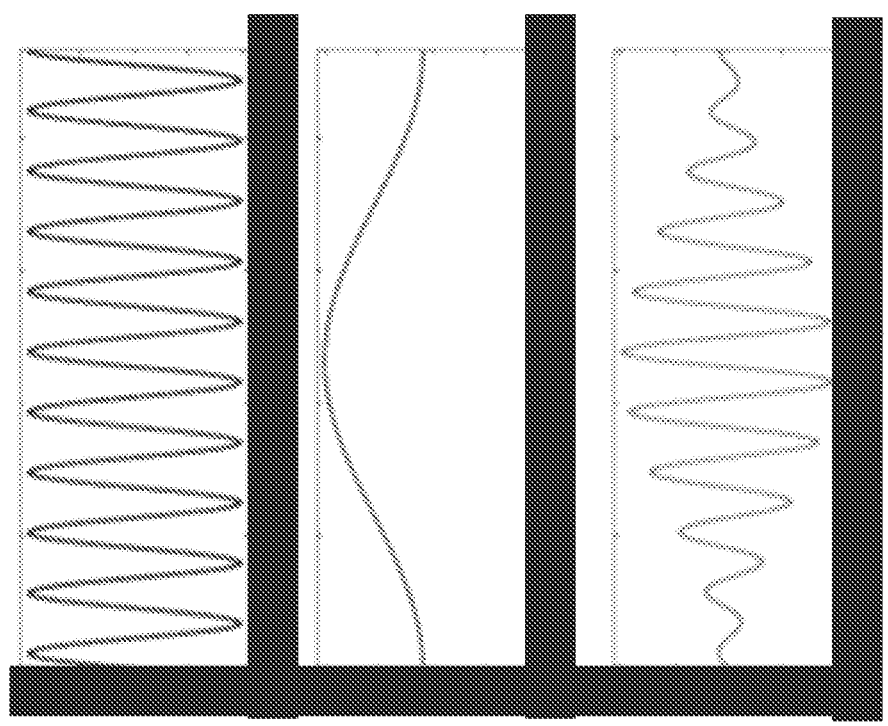

Windowing block 320 performs a windowing operation on each frame to prepare the frame for Fast Fourier Transform block 330. Windowing helps reduce FFT artifacts associated with the frame boundaries (beginning and end). In some embodiments, windowing is performed using the Hamming windowing function, but other windowing functions can also be used, and also windowing can be omitted. FIGS. 5A-5C illustrate the windowing operation: FIG. 5A is a timing diagram of an exemplary signal in an exemplary frame Fi (i=1, 2, . . . in FIG. 4); FIG. 5B diagrams a windowing function (Hamming); and FIG. 5C diagrams the windowed signal output by block 320.

Then FFT is performed in block 330 on each windowed frame output by block 320. The FFT generates the frequency spectrum for the frame, i.e., the amplitudes at different frequencies. Below, the symbol A(n,f) denotes the amplitude of a frame n (i.e., frame Fn) at frequency f. In some embodiments, adjacent frequencies are grouped together in a single bin, and the symbol f identifies the bin. The bin amplitude A(n,f) is the sum of the amplitudes of the frequencies in the bin. Amplitudes A(n,f) can be complex numbers.

Energy block 340 calculates the energies as magnitude squares $|A(n,f)|^2$ of the amplitudes:

$$E(n,f)=|A(n,f)|^2 \tag{1}$$

Energies E(n,f) are provided to blocks 350 and 360 to calculate the features 236. Block 350 calculates Long Term Energy features (LTE). Block 360 calculates Long Term Signal Variability (LTSV) features. The features are provided to block 238 for model execution.

LTE and LTSV features are generally described in the Papadopoulos article cited above. However, some embodiments of the present invention optimize the particular choice of LTE and LTSV features to obtain accurate SNR estimates without using excessive amounts of computer resources.

Figures 6, 7:
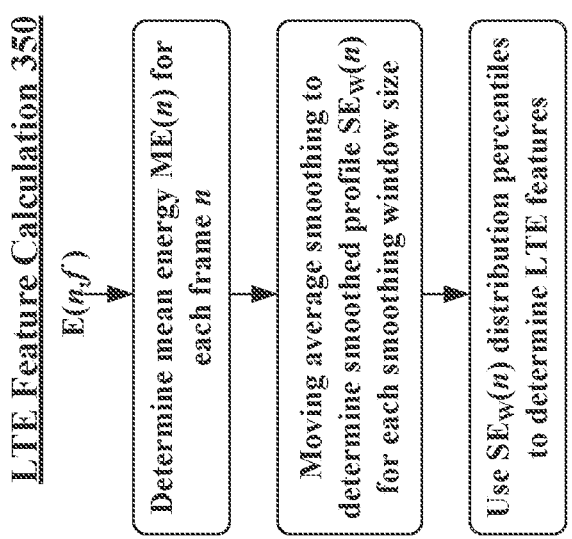
FIG. 6 is a flowchart of audio processing in audio quality monitoring according to some embodiments of the present invention.
FIG. 7 illustrates features extracted from digital audio in audio quality monitoring according to some embodiments of the present invention.

An embodiment of LTE feature calculation block 350 is illustrated in FIG. 6. In block 610, for each frame n, the AQ determines mean energy ME(n) as the mean of energies E(n,f) over all the frequencies f occurring in the frame. (Below, f is referred to as "frequency", but if the frequencies are binned then f may denote a bin of frequencies.))

In block 620, the AQ performs moving average smoothing on energy array ME(n). Some embodiments use simple moving average (SMA) with six smoothing window lengths: 5, 10, 15, 20, 25, 30, to obtain six smoothed energy profiles (smoothed energy signals) $SE_W(n)$, where "W" is the smoothing window size, i.e. the smoothed profiles are $SE_5$(n), $SE_{10}$(n), ... $SE_{30}$(n). If using SMA, each value $SE_W(n)$ is an average of the corresponding values of ME(n). For example, in some embodiments, $SE_W(n)$ is the average of values ME(n), ME(n−1), ME(n−W+1). If n<W, then $SE_W(n)$ can be defined as the average of the first n values, or in any other suitable way as known in the art. Non-SMA smoothing can also be used. The invention is not limited to the particular number or size of smoothing windows.

In block 630, the LTE features are calculated as follows. For each W, the AQ determines percentiles of the corresponding smoothed profile $SE_W(n)$. In some embodiments, the percentiles are defined by the following quadruples:

[5,15, 95, 85]
[10, 20, 90, 80]

The first quadruple represents two percentile ranges: [5%, 15%], i.e. the range of 5% to 15%; and [85%, 95%]. Similarly, the second quadruple represents percentile ranges [10%, 20%] and [80%, 90%].

For any p, the pth percentile in any ordered list of values (scores) can be defined in any suitable way known in the art. For example, the pth percentile can be defined as a value V such that p % of the scores are less than V, and (1−p)% of the scores are greater than or equal to V (the value equal to p % of the scores and the value equal to (1−p)% of the scores can be rounded to an integer). Alternatively, the pth percentile can be defined as the smallest value V in the list such that less than p % of values in the list are less than V, and at least p % of values are less than or equal to V. Alternatively, the pth percentile can be defined as the smallest value V that is greater than p % of the scores, or greater than or equal than p % of the scores, or is a weighted average of the smallest value greater than p % of the scores and the smallest value greater than or equal to p % of the scores. Alternatively, the pth percentile can be defined as a quantile function of p. Other definitions known in the art are also applicable.

For each profile $SE_W(n)$, block 630 determines the profile's percentiles, i.e. the values of profile $SE_W(n)$ in each percentile range. For example, for the percentile range [5%, 15%], the corresponding percentile is the set of all values $SE_W(n)$ that are in the 15th percentile but not in the 5th percentile. Alternatively, the [5%, 15%] percentile range can be defined as the set of all $SE_W(n)$ values that are: (a) higher than or equal to the bottom 5% of the $SE_W(n)$ values, and (b) are in the bottom 15%. (As conventional, if $SE_W(n)$ has equal values in multiple intervals n, these equal values are considered separate values and are not grouped into a single value.)

Further, for the percentile range pair defined by the first quadruple, [5,15, 95, 85], for each smoothed profile $SE_W(n)$, block 630 computes the following LTE feature:

$$\text{LTE feature}=10*\log_{10}[(\text{meanB}-\text{meanA})/\text{meanB}] \tag{2}$$

where meanB is the mean of the smoothed values $SE_W(n)$ in the upper percentile range [85%, 95%], and meanA is the mean of the smoothed profile values in the lower percentile range [5%, 95%].

Similarly, for the percentile range pair defined by the second quadruple, [10, 20, 90, 80], for each smoothed profile $SE_W(n)$, block 630 computes the LTE value given by equation (2), but this time the value meanB is the mean of the smoothed energy values $SE_W(n)$ in the upper percentile range [80%, 90%], and meanA is the mean of the energy values in the lower percentile range [10%, 20%].

Block 630 thus generates two LTE features, corresponding to the two quadruples, for each of the six smoothed profiles $SE_W(n)$, for the total of 12 features. FIG. 7 shows exemplary values of the twelve LTE features in one embodiment.

Figure 8:
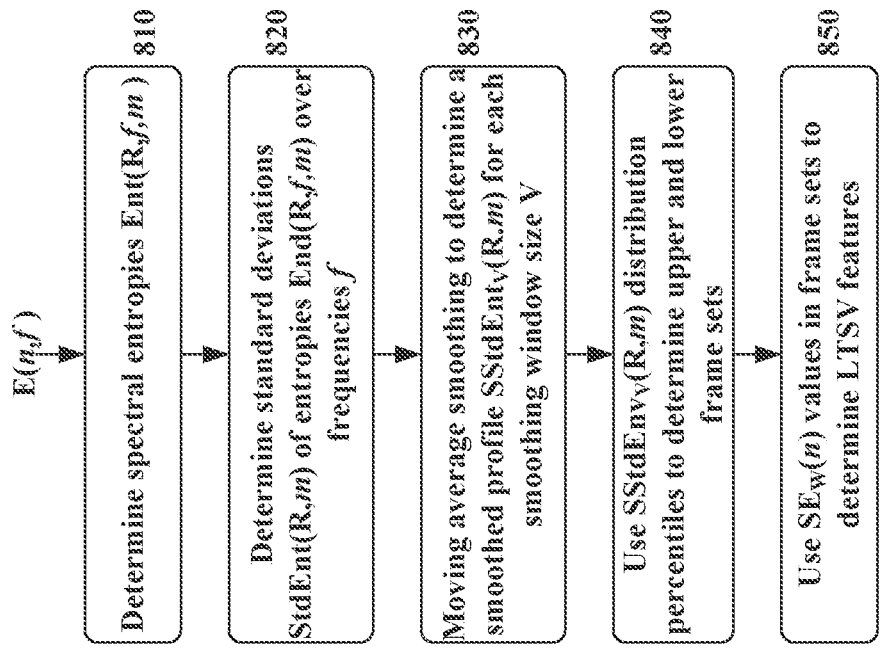
FIG. 8 is a flowchart of audio processing in audio quality monitoring according to some embodiments of the present invention.

FIG. 8 illustrates some embodiments of LTSV feature computation. For ease of understanding, it may be convenient to visualize the energies E(n,f) as a table of FIG. 9: each row contains the energies E(n,fi) at a corresponding one of frequencies fi (i=1, 2, ... ) in consecutive frames n (n=1, 2, ... ), and each column contains the energies for one of frames n at different frequencies fi. The number of frames is shown as N, and the number of frequencies occurring with a non-zero amplitude in at least one frame is shown as K (alternatively, K is the number of frequency bins, and each fi may denote a frequency bin).

The LTSV computation involves defining frame sequences s(R,m) of consecutive R frames, where m is the last frame in the sequence. In some embodiments, R takes values 10, 15, and 20. FIG. 9 illustrates sequences s(10,10), with frames 1 through 10; and s(10,11), with frames 2 through 11. LTSV computation uses all such sequences as follows.

In block 810 (FIG. 8), for each R and m and hence each sequence s(R,m), for each frequency f=fi (i=1, 2, ... K) occurring with a non-zero amplitude in at least one frame 1 through N, the AQ obtains an entropy value Ent(R,f,m) as the spectral entropy of the frequency f component (corresponding to a table row in FIG. 9). More particularly:

Let $$p(R, f, m) = \frac{E(m, f)}{\sum_{n \in s(R,m)} E(n, f)}$$

Then:

$$\text{Ent}(R,f,m)=-\sum_{n \in s(R,m)}[p(R,n,f)*\log_2 p(R,n,f)]$$

In block 820, for each sequence s(R,m), the AQ determines standard deviations StdEnt(R,m) of entropies Ent(R, f,m) over all frequencies f in the corresponding column of FIG. 9. In particular, the mean of all entropies Ent(R,f,m) can be computed as:

$$MEnt(R, m) = \frac{1}{K}\sum_{k=1}^{K} Ent(R, fi, m)$$

The standard deviation can be computed as:

$$StdEnt(R, m) = \frac{1}{K}\sum_{k=1}^{K} [Ent(R, fi, m) - MEnt(R, m)]^2$$

In block 830, for each R, the AQ performs moving average smoothing, e.g. SMA, on values StdEnt(R,m) viewed as a function of m, similarly to block 620. In some embodiments, SMA is performed with window lengths V of 5, 10, 15, 20, 25, 30, to obtain six smoothed entropy profiles SStdEnt$_V$(R,m).

In block 840, the AQ determines certain percentiles of each smoothed profile SStdEnt$_V$(R,m), similarly to step 630. Some embodiments use four quadruples Q1, Q2, Q3, Q4 for SStdEnt$_V$(R,m) at step 840, where:

Q1: [5,15,95,85]
Q2: [10,20,90,80]
Q3: [80,90,20,10]
Q4: [85,95,15,5]

As in block 630, each quadruple Qi defines two percentile ranges. For example, Q1 defines a lower percentile range [5,15], and an upper percentile range [85,95].

For each quadruple Qi, for each profile SStdEnt$_V$(R,m), the AQ determines the profile's percentiles i.e. the values of profile SStdEnt$_V$(R,m) in each percentile range. This is done as in block 630. The two percentile ranges define respective two sets of frames Fi: an upper frame set UFS(Qi,V,R), corresponding to the SStdEnt$_V$(R,m) values in the upper percentile range, e.g. [85, 95] for Q1; and a lower frame set LFS(Qi,V,R), corresponding to the SStdEnt$_V$(R,m) values in the lower percentile range, e.g. [5, 15] for Q1.

Block 850 uses three of the smoothed energy profiles SE$_W$(n) obtained in block 620, with window size W of 10, 20, 30, to compute the LTSV features as follows. For each combination of:

(i) smoothed entropy profile SStdEnt$_V$(R,m), i.e. each V=5, 10, 15, 20, 25, 30;
(ii) smoothed energy profile SE$_W$(n), i.e. each W=10, 20, 30, and
(iii) quadruple Qi, i.e. each i=1, 2, 3, 4,
the AQ computes:

$$10*\log_{10}[(meanB - meanA)/meanB] \quad (3)$$

where meanB is the mean of the smoothed energy values SE$_W$(n) over the upper frame set UFS(Qi,V,R), and meanA is the mean of the smoothed energy values SE$_W$(n) over the lower frame set LFS(Qi,V,R).

Block 850 thus outputs a set of 3*6*3*4=216 features, corresponding to:

three R values: 10, 15, 20;
six V values;
three W values; and
four percentile quadruples Q1 through Q4.

FIG. 10 illustrates an embodiment of block 238. In this embodiment, model 180 is a deep neural network (DNN) with four hidden layers H1 through H4, input layer IL, and output layer OL which outputs the SNR estimate. Each input layer Hi (i=1 through 4) has 1024 neurons 1010. Each neuron 1010 is illustrated in FIG. 11. The neuron's inputs X1, ..., Xn are outputs of the neurons of the previous layer, which is the previous hidden layer (in which case n=1024) or the input layer IL (in which case n=228 as explained below). The inputs are weighted by respective weights w1, ... wn, determined when the model is being trained. The weights may be different in different layers. The weighted inputs are summed as shown at 1110. The weighted sum Z is input to activation function block 1120. In this embodiment, the activation function is ReLU (Rectified Linear Unit), which is a well-known function outputting the maximum of Z and zero. The activation function output Y is provided as the X input to the next layer.

The output layer OL has a single neuron 1014, which is as in FIG. 11 except that the activation function 1120 is omitted. Input layer IL has 228 neurons 1018, one for each of the LTE and LTSV features. Neurons 1018 do not perform any operation on the features, but simply pass the features to hidden layer H1 after normalization by block 1004 described below.

The inputs to block 238 are the 228 features consisting of the twelve LTE features generated by block 350, and the 216 LTSV features generated by block 360. These features are shown as x1, ... x228. In some embodiments, each feature is normalized by block 1004 by subtracting an a-priory mean for this feature, and dividing the result of the subtraction by an a-priori standard deviation for the feature. The a-priory mean and standard deviation can be computed for each feature using the training data set or using some other database. The inventors have discovered that such normalization may improve the SNR estimate. In some embodiments, the training data set or other database used to compute the a-priori mean and standard deviation consist predominantly or exclusively of audio data that has been compressed and then decompressed using the codec associated with the data being processed, e.g. the codec identified by codec ID 208 (FIG. 2).

Model 180 can be trained on audio data with known SNR to determine the weights wi (w1, w2, ...) for each layer as known in the art. The training process is similar to model execution, and is illustrated by the same FIGS. 2-10 as model execution, except that the model SNR output depends on unknown weights wi (FIGS. 10-11). Each training audio data sample 204 has a known SNR, and the weights wi are chosen to reduce the error (e.g. mean square error) between the model SNR output and the known SNR.

Figure 12:
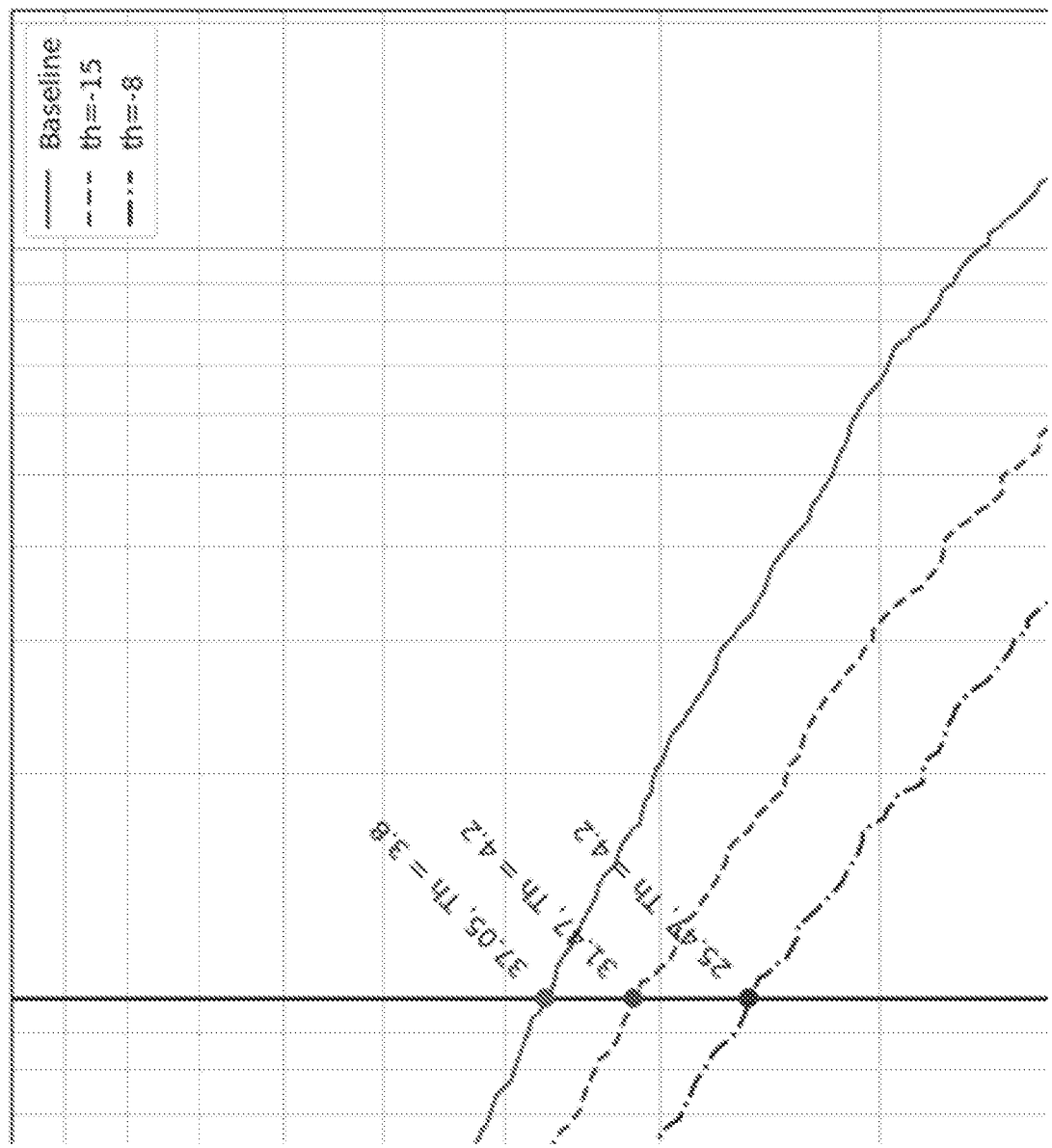
FIG. 12 shows Detection Error Trade off graphs obtained in an experiment according to some embodiments of the present invention.

FIG. 12 illustrates experimental results achieved for a single model with the R, W, and V values given above. The model was trained using digital audio collected (recorded) in environments with various noise types, including cafeterias and other places. Such digital audio is open-source data available from Linguistic Data Consortium (LDC), having an office in Philadelphia, Pennsylvania, United States of America. The open-source data was modified to increase or decrease the noise levels to obtain desired SNR values, and the modified data was used as training data. The training data was split into 70% training, 20% validation, and 10% test sets. FIG. 12 shows DET curves (Detection Error rate Trade off) for three subsets of the training data, with respective three different average SNR values (measured SNR values): the bottom curve corresponds to the average SNR of −8 dB; the middle curve to −15 dB; and the top curve to a baseline dataset with 100% noise. Each of the three curves is a plot of the False Rejection Rate (FRR) along the vertical axis, versus the False Acceptance Rate (FAR) along the horizontal axis, on a logarithmic scale. At FAR=1%, the FRR was 37.05% for the top curve, 31.47% for the middle curve, and 25.47% for the bottom curve. The DET curves of FIG. 12 indicate good agreement between the measured and estimated SNR values because higher DET curves correspond both to higher estimated SNR values and higher measured SNR values.

The following table illustrates data obtained for six decision thresholds: −20 dB, −10 dB, 0 dB, 10 dB, 20 dB, and 30 dB. The data shows the results of SNR estimation on six data sets with the average measured SNR of −8 dB.

|  | Threshold | | | | | |
|---|---|---|---|---|---|---|
|  | −20 | −10 | 0 | 10 | 20 | 30 |
| Percentage | 78.07% | 60.12% | 27.07% | 3.94% | 0.36% | 0.64% |
| −8 | 851/1090 | 653/1086 | 276/1091 | 43/1091 | 4/1091 | 7/1089 |

The "Threshold" row in this table lists the decision thresholds in dB (decibels). The third row shows the total number of calls and the number of the rejected calls for each threshold. For example, for the −20 dB threshold, 851 calls were rejected out of 1090 calls. The second row shows the percentage of the rejected calls (851/1090=78.07%).

Exemplary audio quality monitoring at call center 120 may proceed as follows. When a customer calls the call center, the call center may identify the customer by means of the customer IP address and/or telephone number and/or user name and password and/or some other information made available during the call. The call center may determine the customer account 170 from customer identification, and may determine that the customer has been enrolled in the call center's voice biometrics program. If the customer has been enrolled, the customer voice is recorded during the interaction with the call center, with or without audio quality monitoring, and is stored in recordings database 160 (FIG. 1), possibly in compressed form. The codec used for compression may be preconfigured for all calls at the call center, or may be defined in some other way. The recording is associated with customer account 170.

After the call (offline), an Enrollment operation is performed by controller(s) 148 as follows. The customer voice recording is decompressed, and is provided to AQ 192 as digital data 204 (FIG. 2). If AQ 192 validates some or all of the digital audio 204 by classifying the audio as having high quality, the validated parts are processed to create voice-prints, possibly using known techniques, and the voiceprints are stored in customer voiceprint storage 174 to create or update the enrollment data.

The invention is not limited to the embodiments described above. Some aspects of the present disclosure include the following clauses.

Clause 1. A system including one or more computer processors and computer storage, the system being configured to process audio data by performing a method including:
(1) obtaining, by the system: (a) digital audio data representing an audio stream, and (b) a codec indication which is one of a plurality of codec indications, wherein each codec indication identifies at least one of: (i) at least one codec, or (ii) a parameter value of at least one predefined parameter of at least one codec;
(2) selecting by the system a model for modeling signal-to-noise ratio (SNR) of the obtained digital audio data, the selected model being selected from a plurality of models, wherein each model in the plurality is configured to generate a SNR signal representing an estimated SNR of digital audio data submitted for being processed by the model, wherein the SNR signal is generated by the model in response to a feature signal provided to the model, the feature signal representing one or more features of the submitted digital audio data;
wherein each model is associated with at least one codec indication, and determining the model includes matching the codec indication of the obtained audio stream against one or more of the codec indications associated with the models; and
(3) the method further includes generating, by the determined model executed by the system, an SNR signal representing an estimated SNR of the obtained digital audio data.

2. The system of clause 1, wherein each said codec indication identifies at least one codec used to generate or process the associated digital audio data.

3. The system of clause 1 or 2, wherein each model is configured to model a ratio of a speech signal to noise.

4. The system of any preceding clause, wherein the system is further configured to:
perform a test on a first SNR signal which is the SNR signal representing an estimated SNR of the obtained digital audio data;
if the first SNR signal passes the test, provide the obtained digital audio data for use in one or more tasks, wherein at least one of the tasks includes at least one of:
(i) storing a representation of the obtained digital audio data in computer storage for use as evidence of an interaction with a person;
(ii) using the obtained digital audio data for identifying the person;
(iii) storing identifying information identifying the person for future identification of the person, the identifying information being obtained from the obtained digital audio data; or
(iv) converting the obtained digital audio data to text data;
if the first SNR signal does not pass the test, then generate a signal indicating that the first digital audio data is inadequate for the one or more tasks.

5. The system of clause 4, wherein the one or more tasks include storing the representation of the obtained digital audio data, and the system is configured to obtain the representation and store the representation, wherein obtaining the representation includes compressing the obtained digital audio data using the obtained codec indication.

6. The system of clause 4 or 5, wherein the one or more tasks include storing identifying information identifying the person, wherein:
said obtaining the digital audio data includes decompressing compressed digital audio data by using the obtained codec indication by the system;
wherein the compressed digital audio data represents a person's voice during an earlier interaction between the person and the system, the compressed digital audio data having been obtained by compression using the obtained codec indication.

7. The system of any preceding clause, wherein each model has been trained on training data obtained by compressing and decompressing digital audio data using the one or more codec indications associated with the model.

8. The system of any preceding clause, wherein the system is configured to monitor interaction with a person, wherein the monitoring includes:
obtaining by the system consecutive segments of digital audio data, each segment representing a corresponding segment of the person's voice, said obtained digital audio data being one of the segments;

performing operation (3) on each segment to generate the SNR signal for each segment; and perform a test on each SNR signal;

if any SNR signal fails the test, then generating an alarm, but not generating an alarm as long as the SNR signals pass the test.

9. A system including one or more computer processors and computer storage, the system being configured to process audio data by performing a method including:

(1) obtaining, at the computer system, digital audio data representing an audio stream;

(2) generating a signal-to-noise ratio signal (SNR signal) representing an estimated SNR of the digital audio data, wherein generating the SNR signal includes:

defining a plurality of frames of the digital audio data, each frame being associated with a time interval of the digital audio data;

determining, from the digital audio data, one or more energy profiles, each energy profile associating at least some of the frames with energies of the audio stream in respective time intervals;

determining, from the digital audio data, one or more entropy variation profiles, each entropy variation profile associating at least some of the frames with values defined by spectral entropies of frequency components of the digital audio data on subsets of the plurality of frames;

determining a plurality of frame sets each of which is a subset of the plurality of frames, wherein the frame sets include:

(a) one or more first frame sets defined by predefined percentile ranges of one or more of the energy profiles; and (b) one or more second frame sets defined by predefined percentile ranges of one or more of the entropy variation profiles; and determine a plurality of features which include:

(i) one or more first features each of which is defined by one or more of the energy profiles restricted to one or more of the first frame sets;

(ii) one or more second features each of which is defined by one or more of the energy profiles restricted to one or more of the second frame sets;

provide the first and second features to inputs of a non-linear model of an artificial neural network;

generate the SNR signal by the non-linear model.

10. The system of clause 9, wherein each feature of the first and second features is normalized by using an a priori mean associated with the feature and an a priori standard deviation associated with the feature.

11. The system of clause 10, wherein for each feature of the first and second features, the a priori mean and the a priori standard deviation are determined from training data used to train the non-linear model.

12. The system of clause 9, 10, or 11, wherein the non-linear model is configured to use no information derived from the digital audio data other than the first and second features.

13. The system of clause 9, 10, 11, or 12, wherein the one or more first frame sets are defined by four percentile ranges, and the one or more second frame sets are defined by eight percentile ranges.

14. The system of any one or more of clauses 9 through 13, wherein the artificial neural network is a deep neural network.

15. The system of any one or more of clauses 9 through 14, wherein the system is further configured to:

perform a test on the SNR signal; and if the SNR signal passes the test, then store a representation of the obtained digital audio data in computer storage for use as evidence of an interaction with a person whose voice is encoded in the obtained digital audio data;

if the SNR signal does not pass the test, then generate a signal indicating that the obtained digital audio data is inadequate.

16. The system of any one or more of clauses 9 through 15, wherein the system is further configured to:

perform a test on the SNR signal; and if the SNR signal passes the test, then use the obtained digital audio data for identifying a person whose voice is encoded in the obtained digital audio data;

if the SNR signal does not pass the test, then generate a signal indicating that the obtained digital audio data is inadequate.

17. The system of any one or more of clauses 9 through 16, wherein the system is further configured to:

perform a test on the SNR signal; and if the SNR signal passes the test, then generate identifying information identifying a person whose voice is encoded in the obtained digital audio data, for future identification of the person;

if the SNR signal does not pass the test, then generate a signal indicating that the obtained digital audio data is inadequate.

18. The system of any one or more of clauses 9 through 17, wherein the system is configured to monitor interaction with a person, wherein the monitoring includes:

obtaining by the system consecutive segments of digital audio data, each segment representing a corresponding segment of the person's voice, said obtained digital audio data being one of the segments;

performing operation (2) on each segment to generate the SNR signal for each segment;

perform a test on each SNR signal; and if any SNR signal fails the test, then generating an alarm, but not generating an alarm as long as the SNR signals pass the test.

19. A system including one or more computer processors and computer storage, the system being configured to process audio data by performing a method including:

(1) obtaining, at the computer system, digital audio data representing an audio stream;

(2) generating a signal-to-noise ratio signal (SNR signal) representing an estimated SNR of the digital audio data, wherein generating the SNR signal includes:

defining a plurality of frames of the digital audio data, each frame being associated with a time interval of the digital audio data;

determining, from the digital audio data, one or more energy profiles, each energy profile associating at least some of the frames with energies of the audio stream in respective time intervals;

determining, from the digital audio data, one or more entropy variation profiles, each entropy variation profile associating at least some of the frames with values defined by spectral entropies of frequency components of the digital audio data on subsets of the plurality of frames;

determining a plurality of frame sets each of which is a subset of the plurality of frames, wherein the frame sets include:

(a) one or more first frame sets defined by predefined percentile ranges of one or more of the energy profiles; and
(b) one or more second frame sets defined by predefined percentile ranges of one or more of the entropy variation profiles; and determine a plurality of features which include:
(i) one or more first features each of which is defined by one or more of the energy profiles restricted to one or more of the first frame sets;
(ii) one or more second features each of which is defined by one or more of the energy profiles restricted to one or more of the second frame sets;

provide the first and second features to inputs of a model of an artificial neural network; and
generate the SNR signal by the model;
wherein the model is configured to use no information derived from the digital audio data other than the first and second features.

20. The system of clause 19, wherein:
the obtained digital audio data represents the audio stream with silence removed;
each feature of the first and second features is normalized by using an a priori mean associated with the feature and an a priori standard deviation associated with the feature;
the one or more first frame sets are defined by four percentile ranges, and the one or more second frame sets are defined by eight percentile ranges.

The invention is not limited to the embodiments described above. The invention includes methods performed by the systems defined in the above clauses, and includes machine training methods and systems to train the models defined by the clauses and other models. The invention is not limited to the number of hidden layers, the number of LTE and LTSV features, the window sizes, and other particulars described above, except as defined by the appended claims. One of ordinary skill in the art would recognize many variations, alternatives, and modifications of the foregoing disclosure. Thus, the scope of the present application should be limited only by the following claims, and the claims may be construed broadly and in a manner consistent with the scope of the embodiments disclosed herein.

What is claimed is:

1. A system comprising one or more computer processors and computer storage, the system being configured to process audio data by performing a method comprising:
   (1) obtaining, at the computer system, digital audio data representing an audio stream;
   (2) generating a signal-to-noise ratio signal (SNR signal) representing an estimated SNR of the digital audio data, wherein generating the SNR signal comprises:
   defining a plurality of frames of the digital audio data, each frame being associated with a time interval of the digital audio data;
   determining, from the digital audio data, one or more energy profiles, each energy profile associating at least some of the frames with energies of the audio stream in respective time intervals;
   determining, from the digital audio data, one or more entropy variation profiles, each entropy variation profile associating at least some of the frames with values defined by spectral entropies of frequency components of the digital audio data on subsets of the plurality of frames;
   determining a plurality of frame sets each of which is a subset of the plurality of frames, wherein the frame sets comprise:
   (a) one or more first frame sets defined by predefined percentile ranges of one or more of the energy profiles; and
   (b) one or more second frame sets defined by predefined percentile ranges of one or more of the entropy variation profiles; and
   determining a plurality of features which comprise:
   (i) one or more first features each of which is defined by one or more of the energy profiles restricted to one or more of the first frame sets;
   (ii) one or more second features each of which is defined by one or more of the energy profiles restricted to one or more of the second frame sets;
   providing the first and second features to inputs of a non-linear model of an artificial neural network;
   generating the SNR signal by the non-linear model.

2. The system of claim 1, wherein each feature of the first and second features is normalized by using an a priori mean associated with the feature and an a priori standard deviation associated with the feature.

3. The system of claim 2, wherein for each feature of the first and second features, the a priori mean and the a priori standard deviation are determined from training data used to train the non-linear model.

4. The system of claim 1, wherein the non-linear model is configured to use no information derived from the digital audio data other than the first and second features.

5. The system of claim 1, wherein the one or more first frame sets are defined by four percentile ranges, and the one or more second frame sets are defined by eight percentile ranges.

6. The system of claim 1, wherein the artificial neural network is a deep neural network.

7. The system of claim 1, wherein the system is further configured to:
   perform a test on the SNR signal; and
   if the SNR signal passes the test, then store a representation of the obtained digital audio data in computer storage for use as evidence of an interaction with a person whose voice is encoded in the obtained digital audio data;
   if the SNR signal does not pass the test, then generate a signal indicating that the obtained digital audio data is inadequate.

8. The system of claim 1, wherein the system is further configured to:
   perform a test on the SNR signal; and
   if the SNR signal passes the test, then use the obtained digital audio data for identifying a person whose voice is encoded in the obtained digital audio data;
   if the SNR signal does not pass the test, then generate a signal indicating that the obtained digital audio data is inadequate.

9. The system of claim 1, wherein the system is further configured to:
   perform a test on the SNR signal; and
   if the SNR signal passes the test, then generate identifying information identifying a person whose voice is encoded in the obtained digital audio data, for future identification of the person;
   if the SNR signal does not pass the test, then generate a signal indicating that the obtained digital audio data is inadequate.

10. The system of claim 1, wherein the system is configured to monitor interaction with a person, wherein the monitoring comprises:
- obtaining by the system consecutive segments of digital audio data, each segment representing a corresponding segment of the person's voice, said obtained digital audio data being one of the segments;
- performing operation (2) on each segment to generate the SNR signal for each segment;
- perform a test on each SNR signal; and
- if any SNR signal fails the test, then generating an alarm, but not generating an alarm as long as the SNR signals pass the test.

11. A system comprising one or more computer processors and computer storage, the system being configured to process audio data by performing a method comprising:
- (1) obtaining, at the computer system, digital audio data representing an audio stream;
- (2) generating a signal-to-noise ratio signal (SNR signal) representing an estimated SNR of the digital audio data, wherein generating the SNR signal comprises:
- defining a plurality of frames of the digital audio data, each frame being associated with a time interval of the digital audio data;
- determining, from the digital audio data, one or more energy profiles, each energy profile associating at least some of the frames with energies of the audio stream in respective time intervals;
- determining, from the digital audio data, one or more entropy variation profiles, each entropy variation profile associating at least some of the frames with values defined by spectral entropies of frequency components of the digital audio data on subsets of the plurality of frames;
- determining a plurality of frame sets each of which is a subset of the plurality of frames, wherein the frame sets comprise:
  - (a) one or more first frame sets defined by predefined percentile ranges of one or more of the energy profiles; and
  - (b) one or more second frame sets defined by predefined percentile ranges of one or more of the entropy variation profiles; and
- determine a plurality of features which comprise:
  - (i) one or more first features each of which is defined by one or more of the energy profiles restricted to one or more of the first frame sets;
  - (ii) one or more second features each of which is defined by one or more of the energy profiles restricted to one or more of the second frame sets;
- provide the first and second features to inputs of a model of an artificial neural network; and
- generate the SNR signal by the model;
- wherein the model is configured to use no information derived from the digital audio data other than the first and second features.

12. The system of claim 11, wherein:
- the obtained digital audio data represents the audio stream with silence removed;
- each feature of the first and second features is normalized by using an a priori mean associated with the feature and an a priori standard deviation associated with the feature;
- the one or more first frame sets are defined by four percentile ranges, and the one or more second frame sets are defined by eight percentile ranges.

* * * * *